United States Patent
Poliquin

(10) Patent No.: US 9,950,677 B2
(45) Date of Patent: Apr. 24, 2018

(54) APPARATUS FOR IMAGING THE PASSENGER COMPARTMENT OF A VEHICLE

(71) Applicant: POLYCOM DESIGN INC., Saint-Jerome (CA)

(72) Inventor: Yves Poliquin, Saint-Jerome (CA)

(73) Assignee: POLYCOM DESIGN INC., Saint-Jerome (CA)

( * ) Notice: Subject to any disclaimer, the term of this patent is extended or adjusted under 35 U.S.C. 154(b) by 129 days.

(21) Appl. No.: 14/890,157

(22) PCT Filed: May 22, 2014

(86) PCT No.: PCT/CA2014/000444
§ 371 (c)(1),
(2) Date: Nov. 9, 2015

(87) PCT Pub. No.: WO2014/186870
PCT Pub. Date: Nov. 27, 2014

(65) Prior Publication Data
US 2016/0096488 A1    Apr. 7, 2016

(30) Foreign Application Priority Data

May 23, 2013   (GB) .................................. 1309344.8

(51) Int. Cl.
*H04N 9/47*   (2006.01)
*H04N 7/18*   (2006.01)
(Continued)

(52) U.S. Cl.
CPC ............. *B60R 11/04* (2013.01); *B60R 1/00* (2013.01); *G03B 17/02* (2013.01); *G03B 17/561* (2013.01); *G06K 9/00838* (2013.01); *H04N 5/2252* (2013.01); *H04N 5/2256* (2013.01); *H04N 5/232* (2013.01); *H04N 7/185* (2013.01);
(Continued)

(58) Field of Classification Search
CPC ................................. B06R 11/04; B06R 1/00
See application file for complete search history.

(56) References Cited

U.S. PATENT DOCUMENTS 5,457,370 A * 10/1995 Edwards ................ F16M 11/18
                                                            318/571
6,231,017 B1    5/2001 Watkins
(Continued)

OTHER PUBLICATIONS

International Search Report and Written Opinion for Int. App. No. PCT/CA2014/000444, dated Aug. 11, 2014.
(Continued)

*Primary Examiner* — Hung Dang
*Assistant Examiner* — Girumsew Wendmagegn
(74) *Attorney, Agent, or Firm* — McDonnell Boehnen Hulbert & Berghoff LLP

(57) ABSTRACT

There is described a camera system for imaging a passenger compartment of a vehicle, comprising: a support body having an adjustable length for accommodating the passenger compartment and being removably securable within the passenger compartment of the vehicle; and a camera movably secured to the support body and being movable along at least a portion of the support body, the camera for imaging at least a portion of the passenger compartment.

11 Claims, 5 Drawing Sheets

(51) Int. Cl.

| | |
|---|---|
| *B60R 11/04* | (2006.01) |
| *H04N 5/232* | (2006.01) |
| *H04N 5/225* | (2006.01) |
| *G03B 17/02* | (2006.01) |
| *G03B 17/56* | (2006.01) |
| *B60R 1/00* | (2006.01) |
| *G06K 9/00* | (2006.01) |
| *B60R 11/00* | (2006.01) |

(52) U.S. Cl.
CPC ................ *B60R 2011/0028* (2013.01); *B60R 2011/0082* (2013.01); *B60R 2011/0084* (2013.01); *B60R 2011/0087* (2013.01)

(56) References Cited

U.S. PATENT DOCUMENTS

| | | | |
|---|---|---|---|
| 7,810,880 B2 | 10/2010 | Spellman | |
| 2003/0057339 A1* | 3/2003 | Watkins | B60N 2/4876 248/274.1 |
| 2006/0226322 A1* | 10/2006 | Spellman | B60N 2/4876 248/306 |

OTHER PUBLICATIONS

Camtree Rayo time-lapse with Zycaam pan tilt head; Internet Archive [online]; May 5, 2013 [retrieved on Jul. 30, 2014]; Retrieved from the Internet: <URL:https://web.archive.org/web/20130505230614/http://www.flycamshoppe.com/fc/Camtree-Rayo-time-lapse-with-Zycaam-pan-tilt-head.html>.

* cited by examiner

APPARATUS FOR IMAGING THE PASSENGER COMPARTMENT OF A VEHICLE

CROSS-REFERENCE TO RELATED APPLICATIONS

The present application is a U.S. National Phase Application pursuant to 35 U.S.C. § 371 of International Application No. PCT/CA2014/000444 filed May 22, 2014, which claims priority to GB Patent Application No. 1309344.8, filed May 23, 2013. The entire disclosure contents of these applications are herewith incorporated by reference into the present application.

TECHNICAL FIELD

The present invention relates to the field of camera systems, and more particularly to a camera system for filming the passenger compartment of a vehicle.

BACKGROUND

The Internet is used by some merchants and retailers to improve their sales by attracting new customers to their store. Usually, a retailer or a merchant presents some items to be sold on their website. The quality of the description of items to be sold may encourage a customer to buy the item or at least visit the store. Particularly, pictures or videos of an item to be sold may influence a customer.

For example, car dealers usually display at least some of their vehicles to be sold on their website in order to encourage customers to come visit their store. Usually, car dealers presents pictures of vehicles to be sold on their website. In some instances, some car dealers further display videos of at least some vehicles to be sold to encourage customers to come to their store to see the vehicles, and optionally try the vehicles.

In some instances, customers may be influenced by the quality of the pictures and/or videos of the vehicles. However, the pictures and/or videos are usually manually taken by an employee of the car dealer. Therefore, the pictures and/or videos may not be of high quality and may not appear professional. Particularly, the pictures and/or videos of the passenger compartment of vehicles may not be of a good quality and the shots may change from one passenger compartment to another. Furthermore, taking pictures and/or videos of vehicles is a time-consuming task for employees of a car dealer.

Therefore, there is a need for an apparatus for imaging the passenger compartment of a vehicle.

SUMMARY

According to a broad aspect, there is provided a camera system for imaging a passenger compartment of a vehicle, comprising: a support body having an adjustable length for accommodating the passenger compartment and being removably securable within the passenger compartment of the vehicle; and a camera movably secured to the support body and being movable along at least a portion of the support body, the camera for imaging at least a portion of the passenger compartment.

In one embodiment, the support body comprises an elongated member extending along a longitudinal axis and a telescopic member secured thereto, the telescopic member extending between a first end and a second end and having an adjustable length between the first and second ends, the first and second ends each being removably securable to a respective inside portion of the passenger compartment, and the camera being movably secured to the elongated member.

In one embodiment, the telescopic member is secured to a first side of the elongated member and the camera is movably secured to a second and opposite side of the elongated member.

In one embodiment, the first and second ends are provided with a first hook and a second hook, respectively.

In one embodiment, the first and second hooks are each adapted to be removably secured to a respective handle secured within the passenger compartment.

In one embodiment, the handle is secured to a roof of the passenger compartment.

In another embodiment, the first and second hooks are each adapted to be removably secured to a top end of a respective window of the passenger compartment.

In another embodiment, the first and second ends are each provided with a suction pad adapted to be removably secured to a respective window of the passenger compartment.

In one embodiment, the camera is slidable along the longitudinal axis of the elongated member.

In one embodiment, the camera is further rotatably secured to the elongated member.

In one embodiment, the camera is rotatable about a first rotation axis being substantially orthogonal to the longitudinal axis.

In one embodiment, the camera is rotatable about a second rotation axis being substantially orthogonal to the first rotation axis.

In one embodiment, the camera system further comprises a first motor for sliding the camera along the elongated body, a second motor for rotating the camera about the first rotation axis, and a third motor for rotating the camera about the second rotation axis.

In one embodiment, the camera system further comprises a control unit for controlling the first, second and third motors.

In one embodiment, the control unit comprises a processing unit and a memory coupled thereto, the memory having motion instructions stored thereon, the processing unit being adapted to, upon execution of the motion instructions, change at least one of a position and an orientation of the camera relative to the elongated member.

In one embodiment, the camera system further comprises a first housing for receiving the first and second motors and the control unit, and a second housing for receiving the third motor, the first housing being slidably secured to the elongated member via the first motor, the second housing being rotatably secured to the first housing via the second motor, and the camera being rotatably secured to the second housing via the third motor.

In one embodiment, the first, second, and third motors each comprise a stepper motor.

In one embodiment, the camera system further comprises a battery for powering the control unit and the first, second, and third motors.

In one embodiment, the camera system further comprises a light source for illuminating the passenger compartment.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
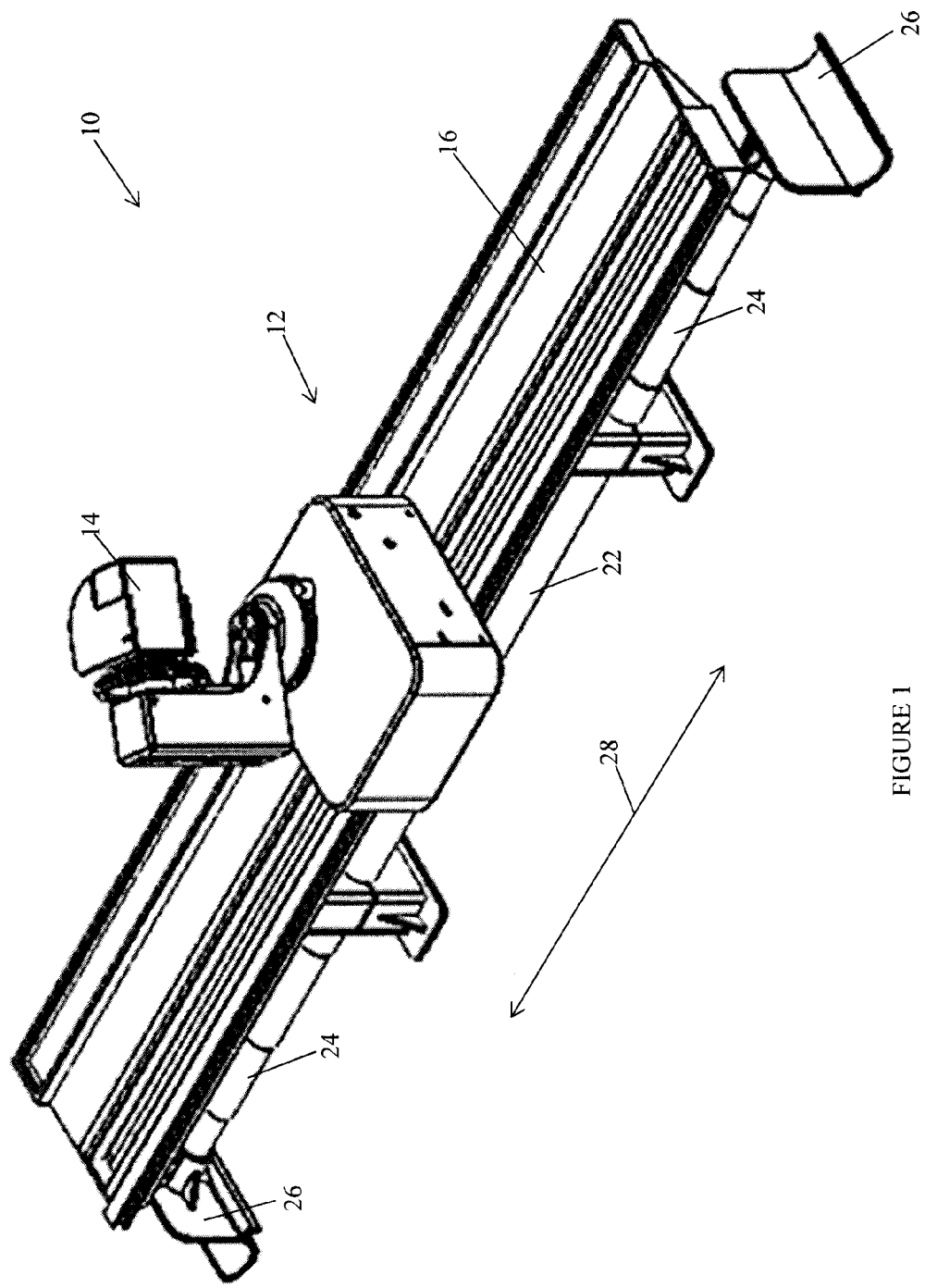
FIG. 1 is a perspective view of an apparatus for imaging the passenger compartment of a vehicle, in accordance with an embodiment.

FIG. 1 illustrates one embodiment of an apparatus 10 for imaging the passenger compartment of a vehicle. The apparatus 10 comprises a support body 12 to which a camera 14 is movably secured. The support body 12 is adapted to be removably secured within the passenger compartment of the vehicle. At least a part of the support body 12 has an adjustable length so as to accommodate to the passenger compartment of the vehicle, i.e. to the dimensions of the passenger compartment. Since it has an adjustable length, the support body 12 can be removably secured within passenger compartments having different dimensions.

The camera 14 is movably secured to the support body, i.e. the camera may move along at least a portion of the support body. It should be understood that any adequate connection between the camera 14 and the support body 12 that allows motion of the camera 14 relative to the support body may be used. In one embodiment, the connection between the support body 12 and the camera 14 allows for a manual motion of the camera 14 relative to the support body 12. For example, the support body may comprise a rail along which the camera 14 may slide, and a user may push the camera 14 along the rail while the camera 14 images a portion of the passenger compartment of the vehicle. In another embodiment, the connection between the support body 12 and the camera 14 is motorized so that the camera 14 may automatically move along at least a portion of the support body 12. In this case, it should be understood that the motorized connection is connectable to a power source. For example, the apparatus 10 may further comprise a battery for powering the motorized connection. The same battery may also be for powering the camera 14.

In one embodiment, the camera 14 is further rotatably connected to the support body 12. In this case, the connection between the support body 12 and the camera 14 is rotatable in order to allow for the rotation of the camera 14 relative to the support body 12 about at least one rotation axis. The rotatable connection may be manually activated to allow a manual rotation of the camera 12 relative to the support body 12. In another embodiment, the rotatable connection between the support body 12 and the camera 14 is motorized so that the camera 14 may rotate relative to the support body 12 automatically. It should be understood that the motorized rotatable connection is then connectable to a power source.

The camera 14 is adapted to image the passenger compartment, i.e. the camera is adapted to take pictures of the passenger compartment and/or film the passenger compartment. In an embodiment in which the camera 14 is adapted to film the passenger compartment, the camera 14 may be manually or automatically moved relative to the support body 12 while filming the passenger compartment. In an embodiment in which the camera is adapted to take pictures of the passenger compartment, the camera 14 may be manually or automatically moved relative to the support body 12 while taking pictures of the passenger compartment. For example, the camera 14 may be positioned to a first position relative to the support body 12 in order to take a first picture of the passenger compartment, then to a second and different position in order to take a second picture of the passenger compartment, and then to a third position relative to the support body 12 in order to take a third picture, etc.

In an embodiment in which the mechanical connection between the support body 12 and the camera 14 is motorized, the apparatus 10 further comprises a control unit for controlling the motorized connection in order to automatically move the camera 14 relative to the support body 12. In one embodiment, the control unit comprises a processing unit and a memory coupled thereto. The memory comprises motion instructions stored thereon. The motion instructions correspond to a pattern of motion for the camera 14 relative to the support body 12. Upon execution of the motion instructions by the processing unit, the control unit sends commands to the motorized connection in order to move the camera 14 relative to the support body 12 according to the motion pattern. A motion pattern is indicative of the different positions for the camera 14 relative to the support body 12 during the motion of the camera. For example, a motion pattern may be indicative of a speed of movement, a start position, an end position, a value for the angle between the camera 14 and the support body 12 during the motion of the camera 14 relative to the support body 12, and/or the like. It should be understood that a position of the camera 14 relative to the support body 12 refers to the position of the camera 14 along the support body 14 and/or the orientation of the camera 14 relative to the support body 12.

In one embodiment, the control unit is further adapted to control the camera. In this case, the control unit is adapted to send commands to the camera in order to film the passenger compartment and/or take pictures of the compartment. For example, the control unit may be adapted to send to the camera 14 a start command while activating the motorized connection so that the camera starts filming the passenger compartment substantially at the same time as the camera starts moving relative to the support body 12, and an end command while deactivating the motorized connection so that the camera 14 stops filming the passenger compartment substantially at the same time as the camera 14 stops moving relative to the support body 12. In another example, the control unit may be adapted to send to the camera 14 a command for taking a picture while the camera 14 is at different reference positions relative to the support body 12. It should be understood that the motion of the camera 14 may be substantially constant while the camera 14 is taking pictures. Alternatively, the motion of the camera 14 may be stopped at predetermined positions of the camera 14 along the support body 12 during a predetermined period of time during which the motion of the camera 14 is stopped and the picture is taken.

In one embodiment, the apparatus 10 further comprises a light source for illuminating the passenger compartment, and thereby improve the quality of the motion picture and/or pictures.

Figure 2:
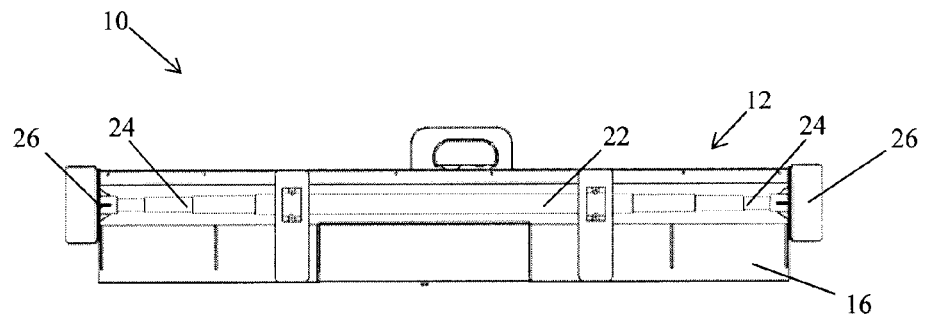
FIG. 2 is a top view of the apparatus of FIG. 1 having telescopic arms in a retracted position, in accordance with an embodiment.
Figure 3:
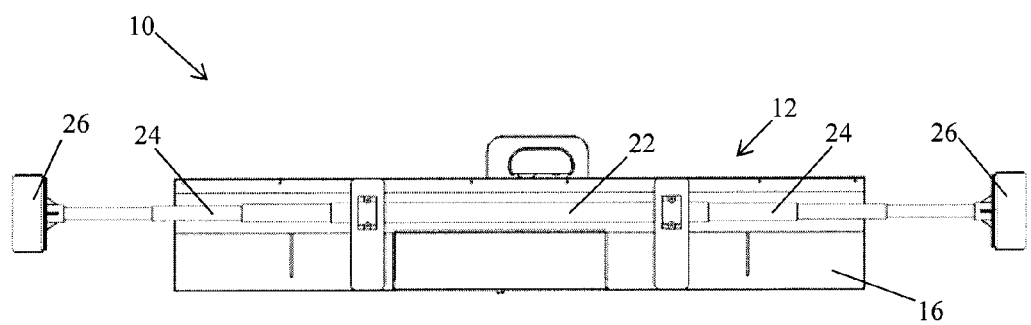
FIG. 3 is a top view of the apparatus of FIG. 1 having telescopic arms in an extended position, in accordance with an embodiment.
Figure 4:
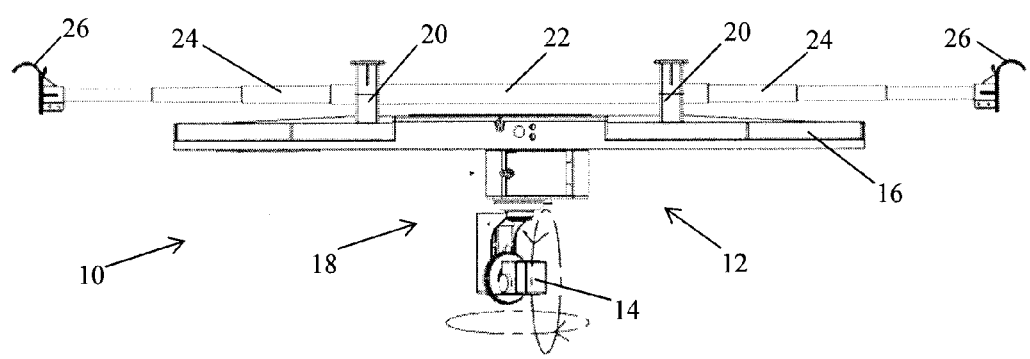
FIG. 4 is a front view of the apparatus of FIG. 3 having telescopic arms in the extended position.

In the following, an exemplary implementation of the apparatus 10 is described. In this implementation, the support body 12 comprises an elongated body 16 extending along a longitudinal axis. The elongated body 16 comprises a bottom end to which the camera 14 is movably secured via a mechanical connection 18, and a top and opposite end from which two connection posts 20 extend. The support body 12 further comprises a telescopic support 22 which is fixedly secured to the connection posts 20 at a position along the length thereof The telescopic support 22 extends substantially along the longitudinal axis and is terminated at both ends with a telescopic arm 24. FIG. 2 illustrates the two telescopic arms 24 in a retracted position. When the two telescopic arms 24 are in the retracted position, the length of the telescopic support 22 is minimal. In one embodiment, the minimal length of the telescopic support substantially correspond to the length of the elongated body. FIG. 3 illustrates the two telescopic arms 24 in an extended position. When the two telescopic arms 24 are in the extended position, the length of the telescopic support is maximal. It should be understood that each telescopic arm 24 may take any position between the retracted and the extended positions in order to accommodate passenger compartments having different dimensions.

While the present description refers to the use of telescopic arms 24 to provide an adjustable length for the support body 12, it should be understood that other adequate configurations may be possible. It should be understood that the term "telescopic" should not be limited to concentric tubular sections designed to slide into one another, but should be understood as any adequate body having an adjustable length. For example, the telescopic arm may be replaced by an assembly of plates slidably secured to one another.

A securing device 26 is provided at the end of each telescopic arm 24. The securing devices 26 are each adapted to be removably secured to a part of the passenger compartment within the passenger compartment.

In one embodiment, the securing devices 26 each comprise a hook, as illustrated in FIG. 1. In one embodiment, the hook is sized and shaped to be removably secured to a handle positioned within the passenger compartment adjacent to the roof thereof, or secured to the roof thereof. In another embodiment, the hook is sized and shaped to be removably secured to the top end of a window of the vehicle. It should be understood that the hook may adapted to be both secured to a vehicle handle or a vehicle window.

In another embodiment, the securing devices 26 each comprise a suction pad adapted to be removably secured to a window of the passenger compartment.

In a further embodiment, the securing devices 26 each comprise a friction pad. In this case, the support body 12 further comprises a securing device for maintaining the telescopic arms 24 in a fixed position between the retracted and the extended positions. In order to removably secure the support body 12 to the passenger compartment, each friction pad is abutted against a respective part of the passenger compartment, such as against a respective window. When the friction pads each abut a respective part of the passenger compartment, the securing device is engaged in order to fix the length of the telescopic arms 24. The apparatus 10 is then removably secured to the passenger compartment due to the friction force between the friction pads and the respective parts of the passenger compartment against which they abut.

As described above, the camera 14 is movable relative to the support body 12 via a mechanical connection 18. As illustrated in FIGS. 1 to 5, the mechanical connection 18 allows the camera 14 to slide along the elongated body 16 according to arrow 28 and rotate about a first and a second axes as illustrated by arrows 30 and 32, respectively. The first rotation axis is substantially orthogonal to the longitudinal axis along which the elongated body 16 extends. The second rotation axis is substantially orthogonal to the first rotation axis.

In the illustrated embodiment of the apparatus 10, the mechanical connection 18 comprises a first housing 34 which is slidably secured to the elongated body 16 on the bottom end thereof and a second housing 36 which is rotatably secured to the first housing 34. The camera is rotatably secured to a side wall of the second housing 36.

Figure 5:
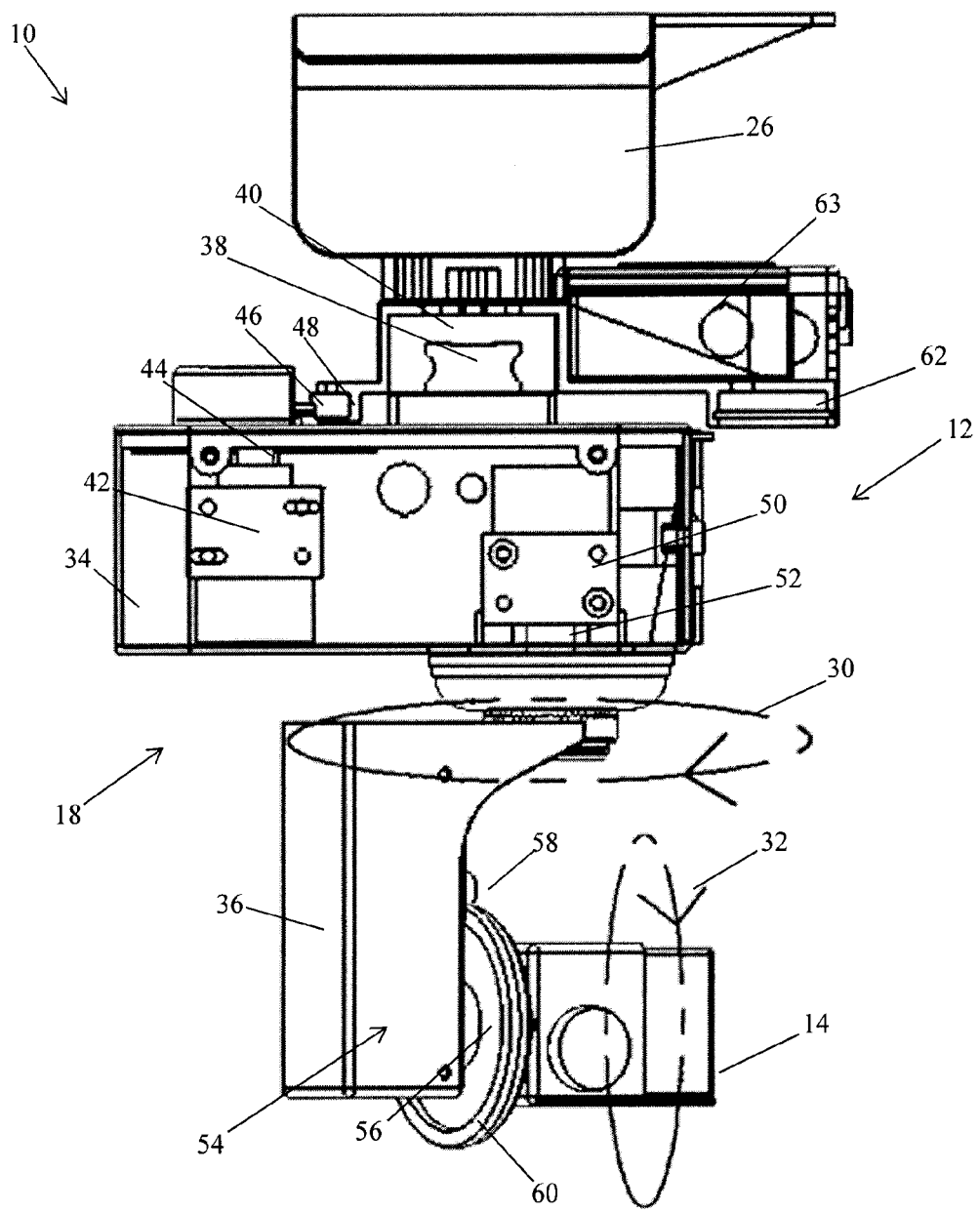
FIG. 5 is a side view of the apparatus of FIG. 1.

As illustrated in FIG. 5, a wheel 38 is secured to the top wall of the first housing 34 and extends therefrom. The elongated body 16 comprises on its bottom face a recess portion 40 which extends along the longitudinal axis of the elongated body 16 and which forms a rail for guiding the displacement of the first housing 34 relative to the elongated body 16. The wheel 38 is positioned within the recess portion 40 and rotates as the first housing 34 slides along the elongated body 16.

As illustrated in FIG. 5, the side walls of the wheel 38 have a convex shape and the side walls of the recess portion 40 have a concave shape that matches the convex shape of the wheel side walls. As a result of the matching shapes of the side walls of the wheel 38 and the recess portion 40, the wheel 38 is maintained in position within the recess portion 40, and the mechanical connection 18 and the camera 14 are supported by the elongated body 16.

The first housing 34 further a first motor 42 of which the rotating shaft 44 extends through an aperture located in the top face of the first housing 34. The first motor 42 is fixedly secured within the first housing 34. A gear 46 is fixedly secured to the shaft 44 outside the first housing 34. The elongated body 16 is further provided with an indented or toothed rail 48 extending along a side thereof and adjacent the top face thereof. The tooth of the gear 46 match the tooth of the indented rail 48, and the gear 46 is positioned so as to engage the indented rail 48. As a result, when the first motor 42 is activated the rotating shaft 44 rotates which triggers the rotation of the gear 46 and the motion of the first housing 34 along the indented rail 48.

A second motor 50 is fixedly secured within the first housing 34. The rotating shaft 52 of the second motor 50 extends through an aperture positioned in the bottom face of the first housing 34.

The second housing 36 is fixedly secured to the rotating shaft 52 of the second motor 50 so that the activation of the second motor 50 triggers the rotation of the rotating shaft 52 and the rotation of the second housing 36 with respect to the first housing 34.

A third motor (not shown) is fixedly secured into the second housing 36 and the rotating shaft 56 of the third motor extends through an aperture in a side face of the second housing 36 and a pinion gear 58 is mounted on the rotating shaft 56. A gear plate 60 is rotatably secured to the side face of the second housing 36 adjacent to the pinion gear 58. The pinion gear 58 and the gear plate 60 are operatively coupled together so that a rotation of the pinion gear 58 triggers a rotation of the gear plate 60. Since the camera 14 is fixedly secured to the gear plate 60, the activation of the third motor 54 triggers the rotation of the camera about the second rotation axis.

A control unit (not shown) is further contained within the first housing. The control unit is configured for controlling the motors 42, 50, and 54, and thereby controlling the position and orientation of the camera 14 with respect to the support body 12. The control unit comprises a processing unit and a memory coupled thereto. The memory comprises motion instructions stored thereon. The motion instructions correspond to a pattern of motion for the camera 14 relative to the support body 12. The pattern of motion is indicative of the position and/or orientation of the camera 14 with respect to the support body 12 during the motion. Upon execution of the motion instructions by the processing unit, the control unit sends commands to the motors 42, 50, and/or 54 in order to move the camera 14 according to the motion pattern.

For example, the motion pattern may be indicative of a motor position for each one of the motors 42, 50, and 54 during the motion of the camera 14.

In one example, the motion of the camera corresponds to a round trip along the elongated body 16. The start and end positions of the camera 14 each correspond to a given end of the elongated body 16. During the round trip motion, the camera 14 is moved from the given end of the elongated to the other end of the elongated body 16, and then comes back to the given end of the elongated body 16. For each position of the camera 14 along the elongated body 16, the motion pattern comprises a motor position for the two motors 50 and 54, i.e. during the motion of the camera 14 from the given end to the other end of the elongated body 16, the motion pattern comprises, for each position along the elongated body 16, a first motor position for the motor 50 ad 54, and during the motion of the camera 14 from the other end to the given end of the elongated body 16, the motion pattern comprises, for each position along the elongated body 16, a second motor position for the motor 50 ad 54.

As described above, the control unit is further operatively connected to the camera 14. In this case, the processing unit is configured for controlling the camera 14. Camera instructions may be stored on the memory and upon execution of the instructions by the processing unit, the camera may film or take pictures of the passenger compartment.

Referring back to FIG. 5, the apparatus 10 is further provided with a light source 62. The light source 62 is secured to an end of the elongated body 16 opposite to the end to which the indented rail 48 is secured. For example, the light source 62 may comprise a plurality of light-emitting diodes (LEDs). The light source 62 may be controlled via a switch to be manually activated. Alternatively, the light source 62 may be control by the control unit.

In one embodiment, the apparatus 10 is connectable to an external power source. In this case, an electrical cable may be used for electrically connecting the motors and the control unit to an external power source.

In another embodiment, the apparatus 10 further comprises a power source such as a rechargeable battery 63, as illustrated in FIG. 5.

It should be understood that the motors 42, 50, and 54 may be any adequate electrical motors such as stepper motors.

Figure 6:
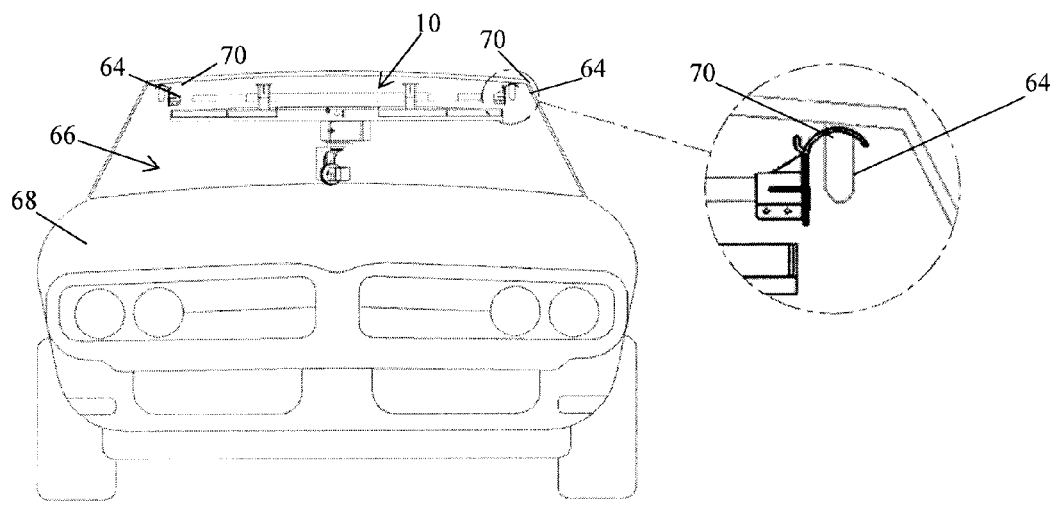
FIG. 6 illustrates the apparatus of FIG. 1 having hooks removably secured to handles of the passenger compartment of a vehicle, in accordance with an embodiment.

FIG. 6 illustrates an exemplary method for removably securing the apparatus 10 to the handles 64 of the passenger compartment 66 of a vehicle 68. Each hook 70 is removably secured to a respective handle 64.

Figure 7:
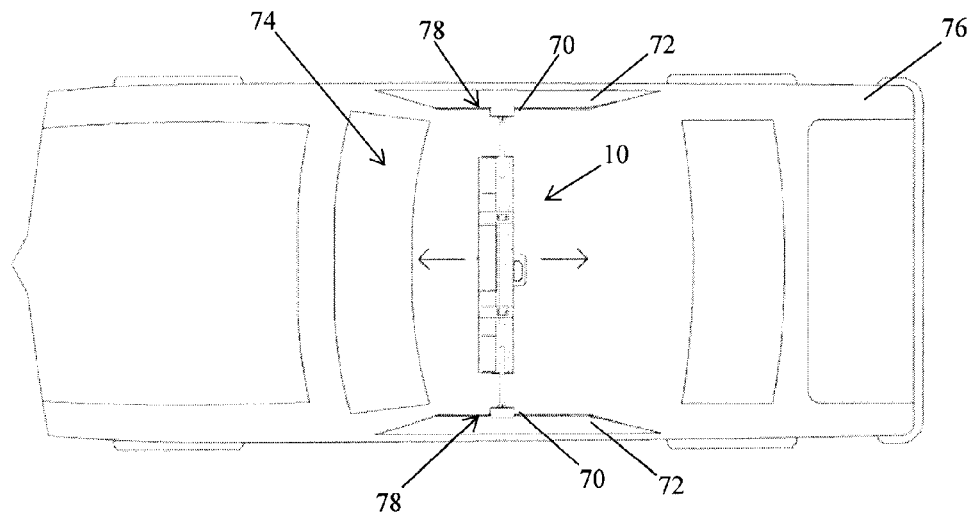
FIG. 7 is a top view of a vehicle having windows to which the apparatus of FIG. 1 is removably secured, in accordance with an embodiment.
Figure 8:
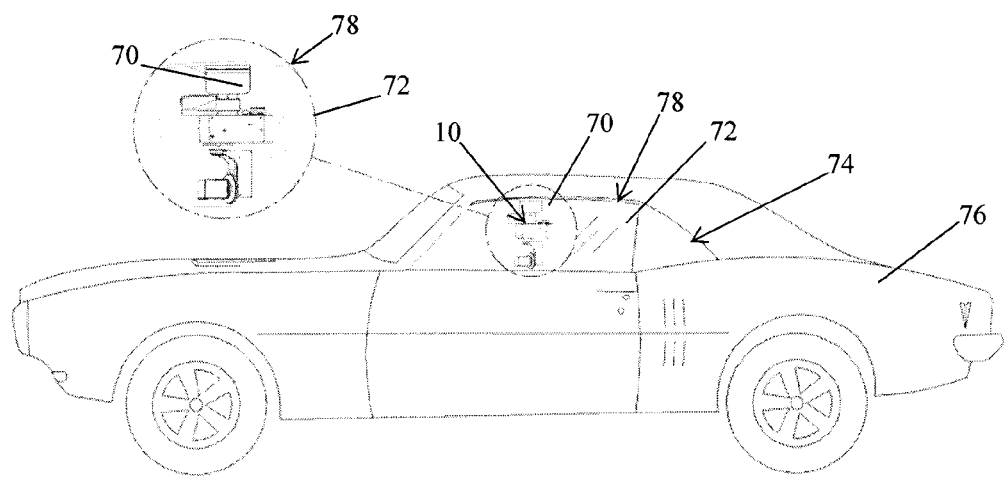
FIG. 8 is a side view of the vehicle of FIG. 7.

FIGS. 7 and 8 illustrates an exemplary method for removably securing the apparatus 10 to windows 72 of the passenger compartment 74 of a vehicle 76. Each hook 70 is removably secured to the top end 78 of a respective window 72.

In one embodiment, the control unit is provided with a communication unit such as a wireless communication unit, and the control unit is remotely controllable using a remote control unit.

In one embodiment, the light source 62 is connected to the power source 63. In another embodiment, the light source 62 is provided with a power source independent from the power source 63. In a further embodiment, the light source is connectable to an external power source that is independent from the apparatus 10.

The embodiments of the invention described above are intended to be exemplary only. The scope of the invention is therefore intended to be limited solely by the scope of the appended claims.

I claim:

1. A camera system for imaging a passenger compartment of a vehicle, comprising:
   a support body having an adjustable length for accommodating the passenger compartment and being removably securable within the passenger compartment of the vehicle; and
   a camera movably secured to the support body and being movable along at least a portion of the support body, the camera for imaging at least a portion of the passenger compartment,
   wherein the support body comprises an elongated member extending along a longitudinal axis and a telescopic member secured thereto, the telescopic member extending between a first end and a second end and having an adjustable length between the first and second ends, the first and second ends each being removably securable to a respective inside portion of the passenger compartment, and the camera being movably secured to the elongated member;
   wherein the camera is slidable along the longitudinal axis of the elongated member, wherein the camera is rotatably secured to the elongated member, wherein the camera is rotatable about a first rotation axis being substantially orthogonal to the longitudinal axis, and wherein the camera is rotatable about a second rotation axis being substantially orthogonal to the first rotation axis;
   wherein the camera comprises a first motor for sliding the camera along the elongated body, a second motor for rotating the camera about the first rotation axis, and a third motor for rotating the camera about the second rotation axis, and wherein the camera further comprises a control unit for controlling the first, second and third motors; and
   wherein the camera system further comprises a first housing for receiving the first and second motors and the control unit, and a second housing for receiving the third motor, the first housing being slidably secured to the elongated member via the first motor, the second housing being rotatably secured to the first housing via the second motor, and the camera being rotatably secured to the second housing via the third motor.

2. The camera system of claim 1, wherein the telescopic member is secured to a first side of the elongated member and the camera is movably secured to a second and opposite side of the elongated member.

3. The camera system of claim 1, wherein the first and second ends are provided with a first hook and a second hook, respectively.

4. The camera system of claim 3, wherein the first and second hooks are each adapted to be removably secured to a respective handle secured within the passenger compartment.

5. The camera system of claim 4, wherein the handle is secured to a roof of the passenger compartment.

6. The camera system of claim 3, wherein the first and second hooks are each adapted to be removably secured to a top end of a respective window of the passenger compartment.

7. The camera system of claim 1, wherein the first and second ends are each provided with a suction pad adapted to be removably secured to a respective window of the passenger compartment.

8. The camera system of claim 1, wherein the control unit comprises a processing unit and a memory coupled thereto, the memory having motion instructions stored thereon, the processing unit being adapted to, upon execution of the motion instructions, change at least one of a position and an orientation of the camera relative to the elongated member.

9. The camera system of claim 1, wherein the first, second, and third motors each comprise a stepper motor.

10. The camera system of claim 1, further comprising a battery for powering the control unit and the first, second, and third motors.

11. The camera system of claim 1, further comprising a light source for illuminating the passenger compartment.

* * * * *